(12) United States Patent
Furukawa et al.

(10) Patent No.: US 10,737,982 B2
(45) Date of Patent: Aug. 11, 2020

(54) MONOLITHIC BASE AND PRODUCTION METHOD THEREFOR

(71) Applicant: NGK INSULATORS, LTD., Nagoya-Shi (JP)

(72) Inventors: Masahiro Furukawa, Frankfurt (DE); Ryotaro Yoshimura, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/123,215

(22) Filed: Sep. 6, 2018

(65) Prior Publication Data

US 2019/0002350 A1    Jan. 3, 2019

Related U.S. Application Data

(63) Continuation of application No. PCT/JP2017/006829, filed on Feb. 23, 2017.

(30) Foreign Application Priority Data

Mar. 31, 2016  (JP) .................................. 2016-071755

(51) Int. Cl.
*C04B 38/00* (2006.01)
*C04B 35/117* (2006.01)
(Continued)

(52) U.S. Cl.
CPC ........ *C04B 35/117* (2013.01); *B01D 39/2075* (2013.01); *B01D 69/10* (2013.01);
(Continued)

(58) Field of Classification Search
CPC . C04B 35/117; C04B 38/0695; C04B 38/009; C04B 38/0074; C04B 2235/3418;
(Continued)

(56) References Cited

U.S. PATENT DOCUMENTS

2003/0175496 A1* 9/2003 Bishop ............... B01D 39/2068
428/312.8
2005/0196586 A1   9/2005 Shimodaira et al.
(Continued)

FOREIGN PATENT DOCUMENTS

JP   2005-519835 A1   7/2005
JP   2005-247605 A1   9/2005
(Continued)

OTHER PUBLICATIONS

International Search Report and Written Opinion (Application No. PCT/JP2017/006829) dated May 16, 2017.
(Continued)

*Primary Examiner* — Noah S Wiese
(74) *Attorney, Agent, or Firm* — Burr & Brown, PLLC

(57) ABSTRACT

The monolithic base is a porous alumina body that includes pores and that is configured by alumina particles as an aggregate and an oxide phase as a binding material. The alumina particles include microscopic alumina particles having a particle diameter of greater than or equal to 0.5 μm and less than or equal to 5 μm and coarse alumina particles having a particle diameter of greater than 5 μm. The number of microscopic alumina particles that are encapsulated in the oxide phase is greater than or equal to 50% of the total number of microscopic alumina particles and coarse alumina particles.

14 Claims, 7 Drawing Sheets

(51) Int. Cl.
   *B01D 69/10* (2006.01)
   *C04B 38/06* (2006.01)
   *B01D 39/20* (2006.01)
   *C04B 111/40* (2006.01)

(52) U.S. Cl.
   CPC ............ *C04B 38/00* (2013.01); *C04B 38/009* (2013.01); *C04B 38/0074* (2013.01); *C04B 38/06* (2013.01); *C04B 38/0695* (2013.01); *C04B 2111/40* (2013.01); *C04B 2235/3217* (2013.01); *C04B 2235/3418* (2013.01)

(58) Field of Classification Search
   CPC ........ C04B 2235/3217; C04B 2111/40; B01D 69/10; B01D 39/2075
   See application file for complete search history.

(56) References Cited

U.S. PATENT DOCUMENTS

| | | | | |
   |---|---|---|---|---|
   | 2010/0310819 | A1* | 12/2010 | Suwabe | C04B 41/009 428/116 |
   | 2014/0014574 | A1* | 1/2014 | Teranishi | B01D 63/066 210/500.25 |
   | 2015/0008177 | A1* | 1/2015 | Yajima | B01D 63/066 210/488 |
   | 2015/0260065 | A1 | 9/2015 | Kikuchi et al. | |
   | 2016/0375406 | A1 | 12/2016 | Teranishi et al. | |
   | 2017/0007967 | A1 | 1/2017 | Teranishi et al. | |

FOREIGN PATENT DOCUMENTS

| | | |
   |---|---|---|
   | JP | 2010-228946 A1 | 10/2010 |
   | JP | 2015-174036 A1 | 10/2015 |
   | WO | 2009/063997 A1 | 5/2009 |
   | WO | 2012/128218 A1 | 9/2012 |
   | WO | 2013/147271 A1 | 10/2013 |
   | WO | 2015/146488 A1 | 10/2015 |
   | WO | 2015/151699 A1 | 10/2015 |

OTHER PUBLICATIONS

English translation of International Preliminary Report on Patentability (Chapter I) (Application No. PCT/JP2017/006829) dated Oct. 11, 2018.

* cited by examiner

FIG. 4 EXAMPLE 1

EXAMPLE 5

EXAMPLE 6

COMPARATIVE EXAMPLE 1

MONOLITHIC BASE AND PRODUCTION METHOD THEREFOR

TECHNICAL FIELD

The present invention relates to a monolithic base and a method of production therefor.

BACKGROUND ART

In relation to a typical monolithic structure that is provided with a monolithic base that includes a plurality of filtration cells and a separation membrane that is formed on an inner surface of the filtration cells, a technique has been proposed to inhibit adverse effects on strength that result from high-temperature alkali processing by suitable provision of a thickness to the separation layer and a partition wall thickness between two filtration cells (reference is made to PCT Laid Open Application 2012/128218).

SUMMARY OF THE INVENTION

According to the method disclosed in PCT Laid Open Application 2012/128218, it is possible to enhance the structural strength of the monolithic base by a structural arrangement of increasing the partition wall thickness of the base between two filtration cells in a monolithic structure.

However, it is sometimes the case that a reduction in weight and/or an increase in compactness is desirable in light of an application of the monolithic structure, and from the point of view of increasing the strength of the structure without increasing the partition wall thickness, there is a need to enhance the strength of the material itself that configures the monolithic base.

The present invention is proposed in light of the situation described above, and has the purpose of providing a monolithic base that exhibits superior strength, and to a method of producing the same.

The monolithic base according to the present invention is a porous alumina body that includes pores and that is configured by alumina particles as an aggregate and an oxide phase as a binding material. The alumina particles include microscopic alumina particles having a particle diameter of greater than or equal to 0.5 µm and less than or equal to 5 µm and coarse alumina particles having a particle diameter of greater than 5 µm. The number of microscopic alumina particles that are encapsulated in the oxide phase is greater than or equal to 50% of the total number of microscopic alumina particles and coarse alumina particles.

EFFECT OF INVENTION

The present invention enables the provision of a monolithic base that exhibits superior strength, and to a method of producing the same.

DESCRIPTION OF EMBODIMENTS

Figure 1:
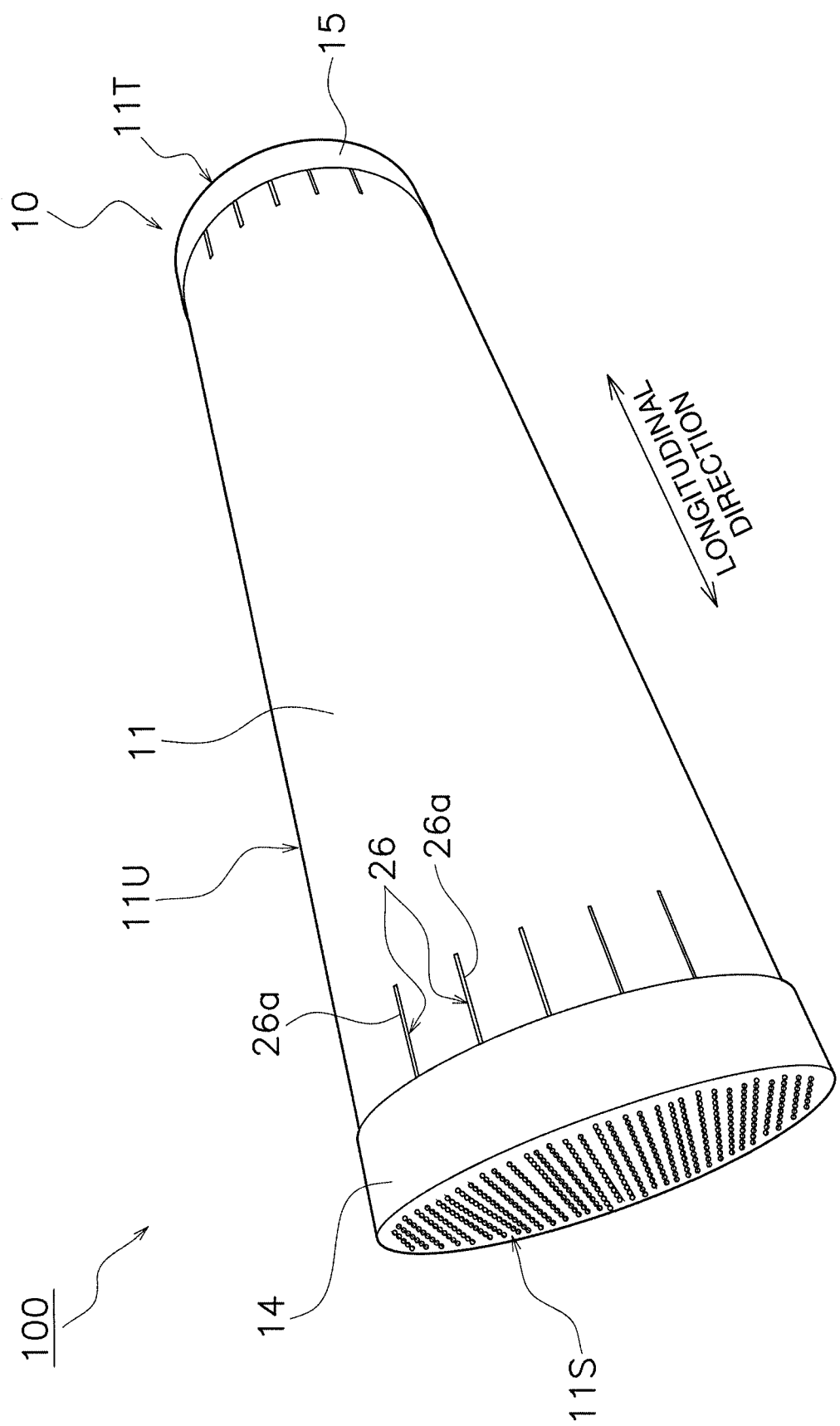
FIG. 1 is a perspective view illustrating a monolithic separation membrane structure.

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different.

In the following embodiments, the term "monolithic" is a concept that denotes a shape that includes a plurality of through holes formed in a longitudinal direction, and includes a honeycomb shape.

Overview of Structure

Figure 2:
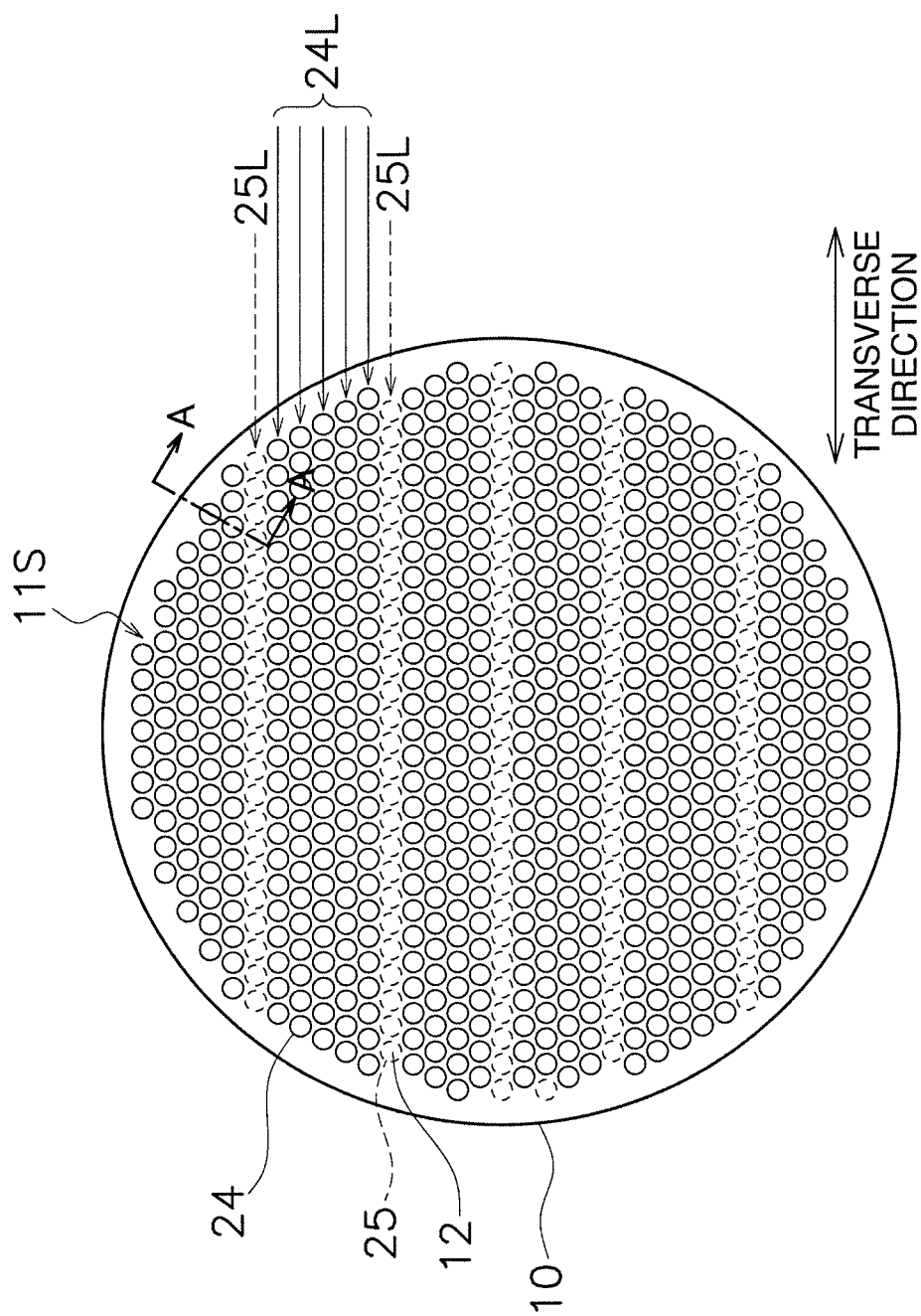
FIG. 2 illustrates a plan view of a first end face of the monolithic separation membrane structure.
Figure 3:
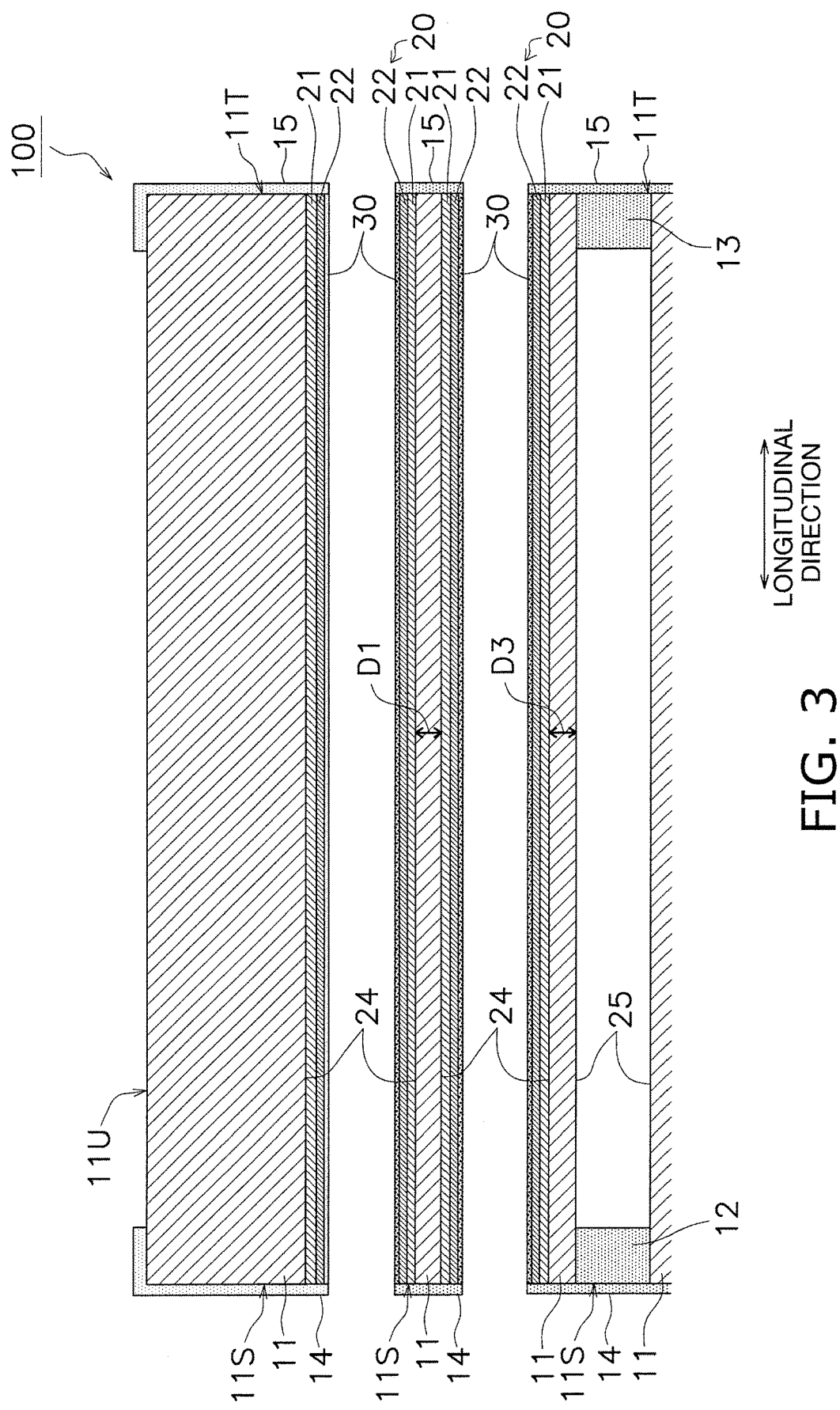
FIG. 3 is a sectional view along A-A in FIG. 2.

The monolithic separation membrane structure 100 is suitably applied to separation of water from a mixture of alcohol and water. As illustrated in FIG. 1 to FIG. 3, the monolithic separation membrane structure 100 is from as a ceramic porous body, and is provided with a monolithic base 10 that has both end faces 11S, 11T and an outer peripheral face 11U. The outer shape of the monolithic base 10 is cylindrical. The monolithic base 10 includes a plurality of filtration cells 24 and a plurality of water collecting cells 25. The plurality of filtration cells 24 penetrates from one end face 11S to another end face 11T and is formed in a row generally in the crosswise direction in FIG. 1. The plurality of water collecting cells 25 penetrates from one end face 11S to another end face 11T and is formed in a row generally in the crosswise direction in FIG. 1.

The cross sectional shape of the filtration cells 24 and water collecting cells 25 in the monolithic separation membrane structure 100 is circular. The filtration cells 24 open onto both end faces 11S, 11T. The opening of both end faces 11S, 11T in the water collecting cells 25 is plugged with a plugging member 12, 13, and a discharge channel 26 is provided so that the water collecting cells 25 communicate with an external space. Furthermore, an intermediate layer 20 and a separation membrane 30 are disposed on an inner wall face of the filtration cells 24 that have a circular cross sectional shape.

The monolithic separation membrane structure 100 forms two discharge channels 26 in proximity to both end faces 11S, 11T for each row (referred to below as "water collecting cell row") 25L of the plurality of water collecting cells 25. There are 5 water collecting cell rows 25L in the monolithic separation membrane structure 100, and at each row, the discharge channel 26 connects the plurality of water collecting cells 25 and opens onto an outer peripheral face 11U of the monolithic base 10.

In FIG. 1 to FIG. 3, since there are 5 water collecting cells rows 25L in the monolithic separation membrane structure 100, the number of discharge channels 26 in the monolithic separation membrane structure 100 at both ends is 10.

The above configuration enables efficient separation from a mixed fluid (fluid mixture or gaseous mixture) that flows into the filtration cells 24 of a component has permeated through the filtration cells 24. More specifically, a permeation component that has permeated through the separation membrane 30 of the inner surface of the filtration cells 24 and that has permeated through the intermediate layer 20 then passes sequentially into the porous body that configures the partition wall inner portion of the monolithic base 10, and is discharged from the outer partition wall 11U. However, the length of the permeation distance that must be traversed in the partition wall (porous body) increases in proportion to an inner position for a filtration cell 24. In this regard, the provision of the wall collecting cells 25 and the discharge channels 26 enables continuous flow in the partition wall between existing filtration cells 24, and facilitates discharge with little pressure loss through the discharge channels 26 and the water collecting cells 25 into an external space.

The monolithic separation membrane structure 100 is provided with seal portions 14, 15 to cover the porous body of both end faces 11S, 11T of the monolithic base 10 into which the mixed fluid flows in order to prevent a mixed fluid from directly flowing in from the porous portion of both end faces 11S, 11T of the monolithic base 10 and being discharged without being separated by the separation membrane 30 that is formed on an inner wall face of predetermined filtration cells 24. Both ends of the filtration cells 24 provided with the separation membrane 30 are connected to and open on the seal portions 14, 15. The inner surfaces of the plurality of respective filtration cells 24 include sequential formation of the intermediate layer 20 and the separation membrane 30.

Configuration for Respective Structures

The monolithic base 10 is formed in a cylindrical shape. The length of the monolithic base 10 in a longitudinal direction may be configured as 100 to 2000 mm. The diameter of the monolithic base 10 may be configured as 30 to 220 mm. The monolithic base 10 may also be an elliptic cylinder or a polygonal prism.

Although there is no particular limitation on the partition wall thickness D1 not including the intermediate layer 20 and the separation membrane 30 of the shortest portion between two adjacent filtration cells 24, it may be configured as greater than or equal to 0.05 mm to less than or equal to 0.8 mm, and is preferably greater than or equal to 0.05 mm to less than 0.2 mm. A configuration in which the partition wall thickness D1 between two filtration cells 24 is configured to be less than 0.2 mm enables densification of the filtration cells 24 and an increase in the total surface area of the separation membrane 30 and therefore increases compactness and/or reduces weight. From the point of view of increasing the total surface area of the separation membrane 30, although densification of the filtration cells 24 is enabled as the partition wall thickness D1 is reduced, since strength will be insufficient if the thickness is too small and the partition wall structure of the monolithic base 10 may collapse during manufacture and/or use, the actual thickness may be configured to be greater than or equal to 0.05 mm. From the point of view of increasing the total surface area while inhibiting collapse of the partition wall structure of the monolithic base 10, the partition wall thickness D1 of two filtration cells 24 is preferably greater than or equal to 0.10 mm and less than or equal to 0.18 mm. In the present embodiment, although all positions between two adjacent filtration cells 24 are configured with a uniform partition wall thickness D1, a plurality of types of partition wall thickness D1 may be present.

As illustrated in FIG. 2, when the first end face 11S is viewed in plan, the plurality of filtration cells 24 forms a plurality of filtration cell rows 24L. The plurality of respective filtration cell rows 24L includes two or more filtration cells 24 that are aligned along a transverse direction (example of a predetermined direction) that is orthogonal to the longitudinal direction. In the present embodiment, 28 filtration cell rows 24L are formed that align 7 to 29 filtration cells 24 in each row. However, the number of filtration cells 24 in each row or the number of the filtration cell rows 24L may be suitably varied.

Although there is no particular limitation in relation to the partition wall thickness D3, not including the intermediate layer 20 and the separation membrane 30, of the shortest portion of adjacent filtration cells 24 and water collecting cells 25, it may be configured as greater than or equal to 0.05 mm to less than 0.8 mm, and is preferably greater than or equal to 0.05 mm to less than 0.2 mm. A configuration in which the partition wall thickness D3 is configured to be less than 0.2 mm enables an increase in the total surface area of the separation membrane 30. From the point of view of increasing the total surface area of the separation membrane 30, although reduction of the partition wall thickness D3 is preferred due to the resulting densification of the filtration cells 24, since strength will be insufficient if the thickness is too small and the partition wall structure of the monolithic base 10 may collapse during manufacture and/or use, the actual thickness may be configured to be greater than or equal to 0.05 mm. From the point of view that the total surface area can be increased while inhibiting collapse of the partition wall structure of the monolithic base 10, the partition wall thickness D3 is preferably greater than or equal to 0.1 mm and less than or equal to 0.18 mm. Furthermore, in the present embodiment, although all positions between adjacent filtration cells 24 and water collecting cells 25 are configured with a uniform partition wall thickness D3, a plurality of types of partition wall thickness D3 may be present. In addition, although not shown in the drawings, an interval between adjacent water collecting cells 25 may be configured to be greater than or equal to 0.05 mm and less than 0.2 mm, and more preferably greater than or equal to 0.1 mm and less than or equal to 0.18 mm.

As illustrated in FIG. 2, when the first end face 11S is viewed in plan, the plurality of water collecting cells 25 forms a plurality of water collecting cell rows 25L. The plurality of respective water collecting cell rows 25L includes two or more water collecting cells 25 that are aligned along a transverse direction (example of a predetermined direction). In the present embodiment, 5 water collecting cell rows 25L are disposed at mutually separated positions, and although 22 to 29 water collecting cells 25 are aligned in each row, the number of water collecting cells 25 contained in each row or the number or position of the water collecting cell rows 25L may be suitably varied.

As shown in FIG. 1, the discharge channels 26 include an opening 26a that opens onto the outer peripheral face 11U. The opening 26a may be drilled at only one of both the end faces of the monolithic base 10, or may be provided by drilling along the longitudinal direction in addition to both end faces of the monolithic base 10. From the point of view of uniform discharge of the permeation component, the opening 26a is preferably provided on at least both end faces. The number, shape and position of the discharge channels 26 may be the same or may be different in all water collecting cell rows 25L.

The first plugging member 12 and the second plugging member 13 are disposed in all water collecting cells 25. The first plugging member 12 and the second plugging member 13 are arranged in an opposed configuration at both end faces of each water collecting cell 25. The first plugging member 12 and the second plugging member 13 may be configured by use of a porous material. The fill depth of the first plugging member 12 and the second plugging member 13 may be configured to about 5 to 20 mm.

The first seal portion 14 covers a portion of the outer peripheral face 11U and the whole surface of the first end face 11S. The first seal portion 14 suppresses infiltration of a mixed fluid into the first end face 11S. The first seal portion 14 is formed so that the inflow port of the filtration cells 24 is not blocked. The first seal portion 14 covers the first plugging member 12. The material that configures the first seal portion 14 includes glass or metal, rubber, resin, or the like, with glass being preferred in light of its consistency with the coefficient of thermal expansion of the monolithic base 10.

The second seal portion 15 covers a portion of the outer peripheral face 11U and the whole surface of the second end face 11T. The second seal portion 15 suppresses infiltration of a mixed fluid into the second end face 11T. The second seal portion 15 is formed so that the inflow port of the filtration cells 24 is not blocked. The second seal portion 15 covers the second plugging member 13. The second seal portion 15 may be configured from the same material that configures the first seal portion 14.

Monolithic Base 10

Next, the monolithic base 10 is a porous alumina body including pores and is configured by alumina particles as an aggregate and an oxide phase as a binding material.

1. Aggregate

The alumina particles that are used as aggregate are suitably an aggregate of starting materials (aggregate particles) having a controlled particle diameter that are easily obtainable, and enable formation of a stable clay together with exhibiting superior corrosion resistance. Although there is no particular limitation in relation to the volume ratio of aggregate to the total volume of the binding material and the aggregate, it may be configured for example as greater than or equal to 65 volume % and less than or equal to 85 vol %. The volume ratio of aggregate is preferably greater than or equal to 70 volume % and less than or equal to 80 vol %. A configuration in which the volume ratio of aggregate is greater than or equal to 70 volume % enables a reduction in defects such as firing cracks or the like by suppressing contraction during firing (firing shrinkage). A configuration in which the volume ratio of aggregate is less than or equal to 80 volume % enables enhancement of sufficient strength between the binding material and the aggregate particles. The content ratio of alumina particles can be measured using an Archimedes method.

Figure 4:
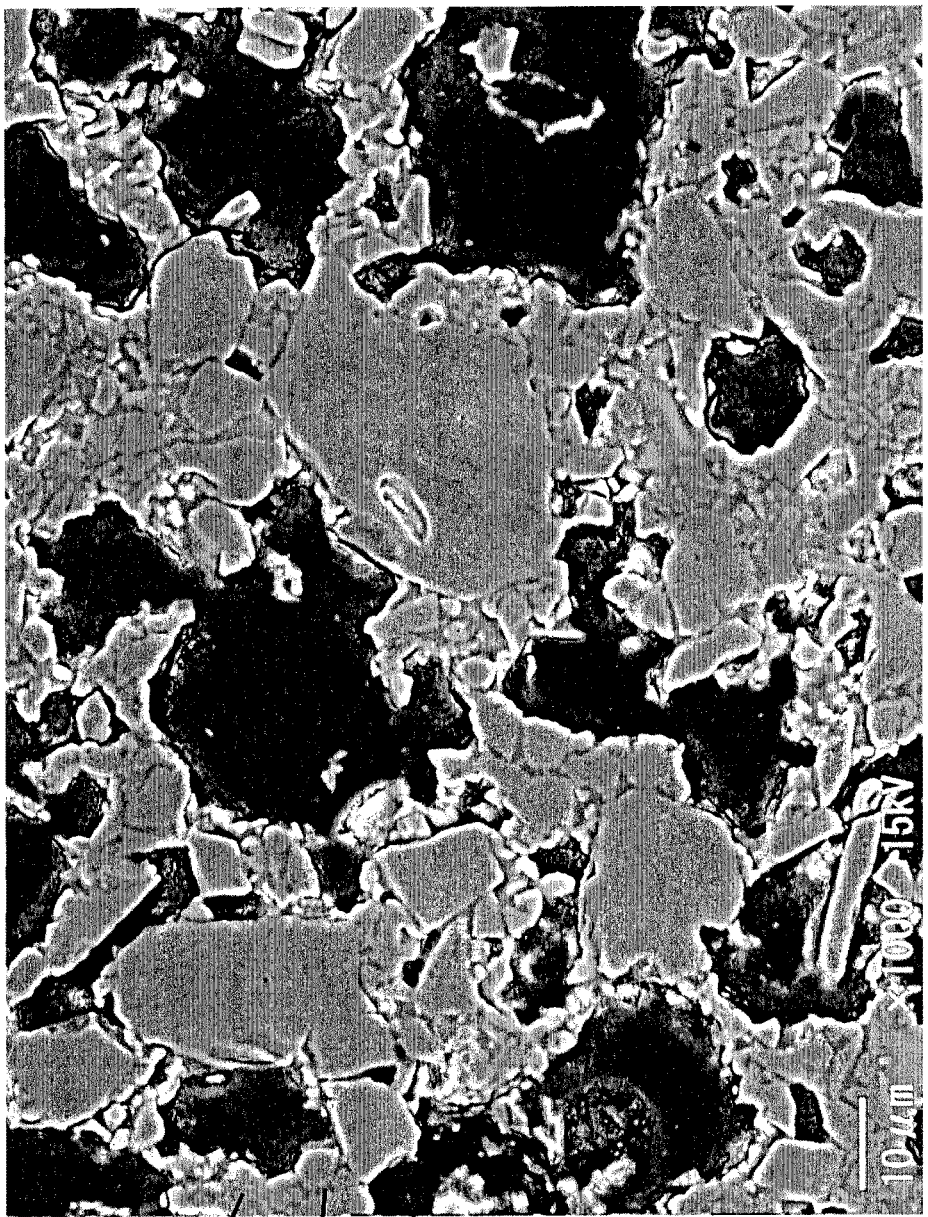
FIG. 4 is a cross-sectional SEM image of a monolithic base according to Example 1.

In this context, FIG. 4 is an example of a cross-sectional SEM (scanning electron microscope) image of the monolithic base 10. The cross-sectional SEM image in FIG. 4 displays the alumina particles (aggregate) as faint gray, the oxide phase (binding material) as dark gray and the pores (holes) as black.

As shown in FIG. 4, the alumina particles include microscopic alumina particles and coarse alumina particles. In the present embodiment, microscopic alumina particle means an alumina particle that has a particle diameter of greater than or equal to 0.5 µm and less than or equal to 5 µm. Coarse alumina particle means an alumina particle that has a particle diameter of greater than 5 µm. The diameter of the alumina particles is assumed to have a circular configuration for the respective aggregate particles in the cross-sectional SEM image of the porous alumina body, and is a diameter that is calculated based on that surface area. In the following description, both the microscopic alumina particles and the coarse alumina particles may be referred to collectively as alumina particles.

As shown in FIG. 4, a portion of all the microscopic alumina particles and a portion of all the coarse alumina particles are encapsulated in the oxide phase. That is to say, the surface of respective microscopic alumina particles of a portion of the total of microscopic alumina particles is covered by the oxide phase, and the surface of respective coarse alumina particles of a portion of the total of coarse alumina particles is covered by the oxide phase. In the present embodiment, the terms "encapsulated in the oxide phase" and "covered by the oxide phase" in relation to the alumina particles means that greater than or equal to 50% of the surface area of the alumina particles is in contact with the oxide phase. Therefore, a configuration in which a portion of more than 50% of the surface area of one alumina particle is adjacent to a pore is a configuration that is not covered by the oxide phase. In the cross-sectional SEM image, when the length of the contact surface that makes contact with an oxide relative to the length of an outer periphery of an alumina particle is greater than or equal to half, it can be determined that greater than or equal to 50% of the surface area of the alumina particle is in contact with the oxide phase.

The number of microscopic alumina particles encapsulated in the oxide phase is greater than or equal to 50% of the total number of microscopic alumina particles and coarse alumina particles. In this manner, the strength of the monolithic base 10 can be conspicuously enhanced. Although the reason for the strength increase as a result of the presence of a large number of microscopic alumina particles in the oxide phase is unclear, it is generally the case that cracks extend in an oxide phase of inferior strength when a crack is produced as a result of the application of stress to the alumina porous body that configures the base. In this context, it may be considered that the strength is enhanced due to suppression of such crack extension in the oxide phase as a result of the presence of microscopic alumina particles in the oxide phase. It is preferred that the number of microscopic alumina particles encapsulated in the oxide phase is greater than or equal to 60% and less than or equal to 95% of the total number of microscopic alumina particles and coarse alumina particles. It is noted that, from the point of view of more effectively suppressing crack extension, it is preferred that the microscopic alumina particles encapsulated in the oxide phase are configured by a greater number of microscopic alumina particles than a number of comparative large particles. The number of microscopic alumina particles encapsulated in the oxide phase can be obtained by counting the number in a cross-section SEM image of microscopic alumina particles of which greater than or equal to 50% makes continuous contact with the oxide phase.

Although there is no particular limitation in relation to the number of coarse alumina particles that are encapsulated in the oxide phase of the total of coarse alumina particles, it may be configured as less than or equal to 30% of the total number of the microscopic alumina particles and coarse alumina particles. In contrast to the microscopic alumina particles, since the coarse alumina particles mainly function as an aggregate that supports the alumina porous body that configures the monolithic base, a configuration of facing the binding material (oxide phase) to thereby support a defined binding surface area with the adjacent microscopic alumina particles is basically sufficient without a necessity for encapsulation in the oxide phase. The proportion of the oxide phase increases as the number of coarse alumina particles that face the oxide phase increases. Conversely, this feature becomes a cause of defects such as firing cracks as a result of the increase in contraction (splitting) during firing. It is preferred that the number of coarse alumina particles that are encapsulated in the oxide phase is less than or equal to 15% of the total number of microscopic alumina particles and coarse alumina particles. The number of coarse alumina particles that are encapsulated in the oxide phase can be obtained by counting the number of coarse alumina particles in a cross-section SEM image of which greater than or equal to 50% makes continuous contact with the oxide phase.

Although there is no particular limitation in relation to a 50% diameter (referred to below as "$D_g50$") in the cumulative volume particle diameter distribution of the alumina particles that configure the base, it may be configured as greater than or equal to 5 μm to less than or equal to 40 μm. $D_g50$ is the so-called median diameter. $D_g50$ is preferably greater than or equal to 10 μm to less than or equal to 25 μm, and more preferably less than or equal to 20 μm.

When the 50% diameter is configured as $10^z$ μm, a 10% diameter (referred to below as "$D_g10$") in the cumulative volume particle diameter distribution of the alumina particles is preferably less than or equal to $10^{(z-0.2)}$ μm. Furthermore, when the $D_g50$ is configured as $10^z$ μm, a 90% diameter (referred to below as "$D_g90$") in the cumulative volume particle diameter distribution of the base particles is preferably greater than or equal to $10^{(z+0.2)}$ μm. Therefore it is preferred that the grain size distribution satisfies $D_g10 \leq 10^{(z-0.2)}$ μm and $D_g90 \geq 10^{(z+0.2)}$ μM, that is to say, that there is a broad grain size distribution.

The cumulative volume particle diameter distribution of the base particles may be measured by calculating the diameter based on the surface area assuming a circular configuration for all the base particles contained in a cross-sectional SEM image that has an arbitrary surface area. More specifically, the pores, alumina particles and oxide phase are discriminated by use of ternary value processing using image analysis of a cross-sectional SEM image in a 200×200 μm range. The surface area is measured in relation to each discriminated alumina particle to thereby enable calculation of the diameter of each alumina particles by circular approximation. Image analysis can be performed for example by use of application software (Image-ProPlus (tradename)) that is used for image analysis and is produced by MEDIA CYBERNETICS Inc.

2. Binding Material

The oxide phase that is used as a binding material is a glass material that includes silicon (Si) and aluminum (Al) and at least one of an alkali metal and an alkali earth metal. The oxide phase preferably includes both of an alkali metal and an alkali earth metal. The alkali metal includes use of at least one of sodium (Na), potassium (K) and lithium (Li). The oxide phase may contain an alkali metal as an alkali metal oxide. The alkali earth metal includes use of at least one of magnesium (Mg), calcium (Ca), strontium (Sr) and barium (Ba). The oxide phase may contain an alkali earth metal as an alkali earth metal oxide. The oxide phase may contain Si as $SiO_2$. The oxide phase may contain Al as $Al_2O_3$.

The content ratio of Si in the oxide phase may be configured to be greater than or equal to 50 mass % and less than or equal to 90 mass % using an $SiO_2$ conversion. The total content ratio of the alkali metal or alkali earth metal in the oxide phase is preferably greater than or equal to 9 mass % and less than or equal to 15 mass % using an oxide conversion. In this manner, the eutectic point of the oxide phase can be reduced, wettability in relation to the alumina particles can be enhanced and infiltration between alumina particles is facilitated. Therefore, the microscopic alumina particles tend to be encapsulated by the oxide phase. As a result, the strength of the monolithic base 10 is conspicuously enhanced since it is possible to encapsulate a large number of microscopic alumina particles in the oxide phase in addition to the robust necking between alumina particles. Furthermore, since the eutectic point is reduced, the firing temperature for the monolithic base 10 can be reduced, and the required energy during firing processing can be reduced.

Although there is no particular limitation in relation to the content ratio of Al in the oxide phase, it can be configured as greater than or equal to 0.1 mass % and less than or equal to 41 mass % using an $Al_2O_3$ conversion. From the point of view of reducing the eutectic point of the oxide phase, the content ratio of Al in the oxide phase is preferably greater than or equal to 5 mass % and less than or equal to 25 mass % using an $Al_2O_3$ conversion.

The weight of the monolithic base 10 can be reduced by decreasing the specific weight of the oxide phase with a configuration in which the content ratio of Si in the oxide phase is greater than the content ratio of Al. Although there is no particular limitation in relation to the specific weight of the oxide phase, it may be configured for example as greater than or equal to 1 g/cc and less than or equal to 3 g/cc, and increasing the content ratio of Si enables a reduction in its specific weight. The specific weight of the oxide phase can be calculated based on the content ratio of the oxide phase and the alumina particles that are measured using Archimedes method. The content ratio of the respective elements in the oxide phase can be measured by eluting only the oxide phase from the monolithic base 10 by use of a hydrofluoric acid process, and quantifying the resulting solution by use of an inductively coupled plasma atomic emission spectrometer (ICP-AES).

Although there is no particular limitation in relation to the content ratio of the oxide phase in the monolithic base 10, it can be configured as greater than or equal to 15 volume % and less than or equal to 40 volume %. The content ratio of the oxide phase is preferably as greater than or equal to 22 volume % in light of enhancing strength by encapsulation of microscopic alumina particles and necking of the coarse alumina particles, and is preferably less than or equal to 38 volume % in light of reducing defects such as firing cracks by suppressing contraction (splitting) during firing. The content ratio of the oxide phase can be measured by quantification with reference to the occupied surface area ratio of the oxide phase in the cross-sectional SEM image.

3. Pores

Although there is no particular limitation in relation to the porosity of the monolithic base 10, it can be configured as greater than or equal to 20% and less than or equal to 60%. When taking into account reducing the pressure loss during the passage of a liquid that has permeated the separation membrane 30 and then passes through the alumina porous body that configures the monolithic base 10, it is preferred that the porosity is greater than or equal to 30%. Furthermore, from the point of view of maintaining a high strength in relation to the alumina porous body that configures the monolithic base, the value is preferably less than or equal to 45%. The porosity may be measured using a mercury press-in method.

Although there is no particular limitation in relation to a 50% diameter (referred to below as "$D_p50$") in the cumulative volume pore diameter distribution of the monolithic base 10, it may be configured as greater than or equal to 1 μm to less than or equal to 10 μm. The $D_p50$ of the pore diameter is preferably greater than or equal to 2 μm to less than or equal to 6 μm. $D_p50$ of the pore diameter is the so-called median diameter.

Although there is no particular limitation in relation to a 10% diameter (referred to below as "$D_p10$") in the cumulative volume pore diameter distribution of the monolithic base 10, when the $D_p50$ is configured as $10^y$ μm, it is preferably less than or equal to $10^{(z+0.5)}$ μm. Although there is no particular limitation in relation to a 90% diameter (referred to below as "$D_p90$") in the cumulative volume pore diameter distribution of the monolithic base 10, when the $D_p50$ is configured as $10^y$ μm, it is preferably greater than or equal to $10^{(y-0.5)}$ μm. Therefore it is preferred that the pore diameter of the monolithic base 10 satisfies $D_p10 \leq 10^{(y+0.5)}$ μm and $D_p90 \geq 10^{(y-0.5)}$ μm. This feature means that the pore diameter of 80% of the total number of pores exhibits a pore diameter distribution that falls within the range of $10^{(y\pm0.5)}$ μm, that is to say, there is a sharp pore diameter distribution. A sharp pore diameter distribution means that there is a low number of small fine pores or large coarse pores relative to $D_p50$. A low number is preferred since small fine pores cannot effectively reduce the pressure loss of a liquid. On the other hand, a low number of large coarse pores is preferred since the base pores will be blocked by penetration of an intermediate layer slurry into an inner portion of the base during film formation of the intermediate layer on the monolithic base.

The cumulative volume pore diameter distribution of the monolithic base 10 may be measured using a mercury press-in method.

Method of Manufacturing Monolithic Separation Membrane Structure 100

Firstly an alumina powder is prepared as a base starting material. The alumina powder is an alumina powder that has a $D_g50$ of greater than or equal to 5 μm to less than or equal to 40 μm, and when the $D_g50$ is configured as $10^z$ μm, the $D_g10$ is less than or equal to $10^{(z-0.2)}$ μm, and the $D_g90$ is greater than or equal to $10^{(z+0.2)}$ μm. Use of an alumina powder that has this type of broad grain size distribution enables provision at the same time of coarse alumina particles that form a solid base, and a large number of microscopic alumina particles that enhance the strength of the oxide phase.

Next, an oxide phase is prepared as the binding material. The oxide phase contains Si and Al and at least one of an alkali metal and an alkali earth metal. The content ratio of the Si in the oxide phase may be configured to be greater than or equal to 50 mass % and less than or equal to 90 mass % using an $SiO_2$ conversion. The total content ratio of an alkali metal or alkali earth metal in the oxide phase is preferably greater than or equal to 9 mass % and less than or equal to 15 mass % using an oxide conversion. The content ratio of Al in the oxide phase is preferably greater than or equal to 0.1 mass % and less than or equal to 41 mass % using an $Al_2O_3$ conversion.

Next, the alumina particles and oxide phase are weighed. At that time, the masses are calculated so that the proportion of the oxide phase relative to the total of the oxide phase and the alumina particles is greater than or equal to 22 volume % and less than or equal to 38 volume %. For example, when weighing so that the volume ratio of the oxide phase and the alumina particles takes the value of 78:22, in the event that the specific weight of the oxide phase is 1 g/cc and the specific weight of the alumina particles is 4 g/cc, weighing may be performed so that the mass ratio of the oxide phase and the alumina particles takes the value of 93.4:6.6. Furthermore, for example, when weighing so that the volume ratio of the oxide phase and the alumina particles takes the value of 62:38, in the event that the specific weight of the oxide phase is 3 g/cc and the specific weight of the alumina particles is 4 g/cc, weighing may be performed so that the mass ratio of the oxide phase and the alumina particles takes the value of 69:32. That is to say, weighing may be performed so that the mass of the oxide phase relative to the total mass of the oxide phase and the alumina particles is greater than or equal to 6.6 mass % and less than or equal to 32 mass % using an oxide conversion.

Next, a clay is prepared by adding water, a dispersant and an organic binder such as methyl cellulose to the weighed oxide phase and the alumina particles, and then kneading. When there is a desire to increase the porosity of the monolithic base, a pore forming agent is added.

Then, the prepared clay is extrusion molded, for example, using a vacuum extruder, to obtain a green body for the monolithic base that has a plurality of filtration cells 24 and a plurality of water collecting cell 25.

Then, the green body for the monolithic base is fired for example at 900 to 1600 degrees C. to obtain a monolithic base, and a cut for the discharge channel is formed to communicate from one position of the outer peripheral face through the water collecting cell 25 to another position. The cut for the discharge channel can be formed by cutting with a band saw or disk cutter, a wire saw or the like provided with a diamond abrasive while applying a laser reference to both end faces at which the discharge channel 26 will be formed. During the cutting operation, friction and/or heat production can be reduced by use of a solvent such as water or the like since the life of the cutting tool will be reduced as a result of heat production and/or loss of the diamond abrasive due to friction between the monolithic base and the cutting tool.

Next, in the resulting monolithic base, a plugging material in the form of a slurry is filled into a space that reaches the discharge channel 26, from both end faces of the water collecting cells formed by cutting the discharge channel to therefore obtain a plugging material-filled monolithic base. More specifically, a film (masking) such as polyester or the like is applied to both end faces of the monolithic base, and a hole is drilled into the film with reference to laser irradiation or the like at the portion corresponding to the discharge channel 26.

Then, the end face of the monolithic base with the film applied thereto is pressed into a container filled with the plugging material (slurry), and is filled by application of a pressure for example of 200 kg by use of an air cylinder or the like to thereby obtain a plugging material-filled monolithic base. The plugging material-filled fired monolithic base is fired for example at 900 to 1400 degrees C. to thereby obtain a plugging material-filled monolithic base.

Then, an intermediate layer 20 is formed as a foundation for the separation membrane 30 on an inner wall face of the filtration cells 24 of the plugging material-filled monolithic base. An intermediate layer slurry is firstly prepared in order to form the intermediate layer 20 (film formation). The intermediate layer slurry can be prepared by adding 400 parts by mass of water to 100 parts by mass of a ceramic starting material having a desired particle diameter (for example, an average particle diameter of 1 μm to 5 μm). Then, a membrane inorganic binding material may be added to the intermediate layer slurry to increase the membrane strength after sintering. The membrane inorganic binding material may include use of clay, kaolin, a titania sol, silica sol, glass frit, or the like. The addition amount of the membrane inorganic binding material is preferably 5 to 42 parts by mass in light of film strength.

The intermediate layer slurry is deposited on an inner wall face of the filtration cells 24, and after drying, the intermediate layer 20 is formed by sintering for example at 900 to 1050 degrees C. The intermediate layer 20 may be formed into a film as a plurality of separate layers such as the intermediate layer 21 and the intermediate layer 22 by use of a plurality of types of slurry that vary the average particle diameter. In a configuration of forming the intermediate layer 20 into a plurality of layers, the film forming process and the firing process may be executed in relation to each intermediate layer, or after repeating a plurality of film forming processes, an integral firing step may be performed.

Next, after coating a glass starting material slurry by spray atomization or brushing onto an end face of the resulting monolithic base with the intermediate layer attached thereto, a green body for the first and second seal portions 14, 15 may be formed by firing for example at 800 to 1000 degrees C. A glass starting material slurry for example can be adjusted by mixing an organic binder and water into glass frits. Although a configuration has been described in which the material for the first and seal portions 14 and 15 is glass, as long as the first and second seal portions 14 and 15 prevent passage of the separation fluid that is discharged from the discharge channel 26 after separation from the mixed fluid that is the object of the separation process, it is possible for example to use a silicon resin or a teflon (registered trademark) resin, or the like. In a configuration in which the intermediate layer 20 has a multilayered structure, a green body for the first and second seal portions 14 and 15 may be formed during formation of the intermediate layer 20.

Next, a separation membrane 30 is formed on an inner surface of the intermediate layer 20. In this context, when the average pore diameter of the separation membrane 30 is less than 1 nm and when a thinner film must be formed in order to reduce pressure loss, it is preferred to further provide a foundation layer between the intermediate layer 20 and the separation layer 30. For example, on top of the intermediate layer 20, it is preferred that a titania sol is obtained by hydrolysis of titanium isopropoxide in the presence of nitric acid, diluted with water to prepare a foundation layer sol, and then after the prepared foundation layer sol has flowed onto the inner wall surface of a predetermined cell of the monolithic base provided with the intermediate layer, thermal treatment is performed for example at 400 to 500 degrees C. to form a foundation layer film. The method of forming the separation membrane 30 may be a suitable method depending on the type of separation membrane.

The separation membrane 30 may use a known MF (microfiltration) membrane, UF (ultrafiltration) membrane, gas separation membrane, pervaporation membrane or vapor permeable membrane, or the like. More specifically, the separation membrane 30 includes use of a ceramic membrane (for example, reference is made to Japanese Patent Application Laid-Open No. 3-267129, Japanese Patent Application Laid-Open No. 2008-246304), a carbon monoxide separation membrane (for example, reference is made to Japanese Patent No. 4006107), a helium separation membrane (for example, reference is made to Japanese Patent No. 3953833), a hydrogen separation membrane (for example, reference is made to Japanese Patent No. 3933907), a carbon membrane (for example, reference is made to Japanese Patent Application Laid-Open No. 2003-286018), a zeolite membrane (for example, reference is made to Japanese Patent Application Laid-Open No. 2004-66188), a silica membrane (for example, reference is made to the pamphlet of PCT Laid Open Application 2008/050812), an organic-inorganic hybrid silica membrane (for example, reference is made to Japanese Patent Application Laid-Open No. 2013-203618), and a p-tolyl group-containing silica (for example, reference is made to Japanese Patent Application Laid-Open No. 2013-226541) or the like. The method of forming the separation membrane 30 may be a suitable method depending on the type of separation membrane.

Other Embodiments

Although an embodiment of the present invention has been described, the present invention is not limited to the above embodiment, and various modifications are possible within a scope that does not depart from the spirit of the invention.

The monolithic separation membrane structure 100 has been provided with filtration cells 24 and water collecting cells 25. However, the water collecting cells 25 may be omitted, and in such a configuration, the monolithic separation membrane structure 100 may also omit the discharge channel 26.

Although all the inner diameters of the filtration cells 24 are configured to be equal, there is no limitation in this regard. Although all the inner diameters of the water collecting cells 25 are configured to be equal, there is no limitation in this regard.

The respective first and second seal portions 14, 15 have been configured to cover a portion of the outer peripheral face 11U. However, the outer peripheral face 11U need not be covered.

EXAMPLES

The examples of a monolithic base (alumina porous body) according to the present invention will be described below. However, the present invention is not thereby limited to the following examples.

Preparation of Examples No. 1 to No. 9, and Comparative Examples 1 and 2

A monolithic base according to Examples No. 1 to No. 9, and Comparative Examples 1 and 2 was prepared as described below.

Firstly, the binding material and aggregate were weighed as shown in Table 1, then, a clay was prepared by adding water, a dispersion agent and a thickening agent, in addition to a pore forming agent if required, to the weighed binding material and aggregate, and kneading.

Next, a green body for the monolithic base that has a plurality of filtration cells and a plurality of water collecting cells was formed by extrusion molding of the prepared clay.

A monolithic base was prepared by firing the green body for the monolithic base for 2 hours using a firing temperature as shown in Table 1.

Cross-Sectional Observation of Monolithic Base

A cross-sectional SEM image (backscattered electron image, JSM-5410 manufactured by JEOL Ltd.) of the monolithic base was used to calculate the percentage of alumina microparticles encapsulated in the oxide phase relative to the total alumina particles.

Furthermore, the content ratio (volume %) of the oxide phase was calculated using the cross-sectional SEM image.

The content ratio (volume %) of the oxide phase was obtained with reference to the occupied surface area ratio (surface area %) of the oxide phase in the cross-sectional SEM image. The measurement results are shown in Table 1.

Quantification of Respective Elements in Oxide Phase

The monolithic base was treated with hydrofluoric acid and the eluted oxide phase was quantified using an inductively coupled plasma atomic emission spectrometer (ULTIMA2 manufactured by Horiba Ltd.). The resulting content ratio of each element is shown in Table 1.

Porosity and Pore Diameter Distribution of Monolithic Base

The porosity and pore diameter distribution ($D_p50$, $D_p10$, $D_p90$) of the monolithic base in Examples 1 to 9 and Comparative Examples 1 and 2 was measured using a mercury press-in method. The measurement results are shown in Table 1.

Strength of Monolithic Base

A 4 point strength of the monolithic base in Examples 1 to 9 and Comparative Examples 1 and 2 was measured with reference to JIS R 1601.

TABLE 1

| | | | Example 1 | Example 2 | Example 3 | Example 4 | Example 5 | Example 6 |
|---|---|---|---|---|---|---|---|---|
| Filtration Cell | Inner Diameter | mm | 1.8 | 1.8 | 1.8 | 1.8 | 1.8 | 1.8 |
| | Partition Wall Thickness | mm | 0.15 | 0.15 | 0.15 | 0.15 | 0.15 | 0.15 |
| Separation Membrane | Diameter φ | mm | 63 | 63 | 63 | 63 | 63 | 63 |
| | Length L | mm | 300 | 300 | 300 | 300 | 300 | 300 |
| | Membrane Surface Area | m² | 0.97 | 0.97 | 0.97 | 0.97 | 0.97 | 0.97 |
| Grain Size Distribution Aggregate Powder | Dg50 ($10^z$) | μm | 12 | 12 | 12 | 12 | 12 | 14 |
| | z | | 1.1 | 1.1 | 1.1 | 1.1 | 1.1 | 1.1 |
| | Dg10 ($10^{z-\alpha}$) | μm | 1.1 | 1.1 | 1.1 | 1.1 | 1.1 | 2.8 |
| | α | | 1.1 | 1.1 | 1.1 | 1.1 | 1.1 | 0.7 |
| | Dg90 ($10^{z+\beta}$) | μm | 33 | 33 | 33 | 33 | 33 | 26 |
| | β | | 0.43 | 0.43 | 0.43 | 0.43 | 0.43 | 0.29 |
| Aggregate Mixing Ratio | | wt % | 85 | 88 | 88 | 85 | 80 | 85 |
| Binding Material Mixing Ratio | | wt % | 15 | 12 | 12 | 15 | 20 | 15 |
| Composition in Oxide Phase | SiO₂ Content Ratio | wt % | 69 | 69 | 69 | 68 | 69 | 69 |
| | Al₂O₃ Content Ratio | wt % | 16 | 16 | 16 | 16 | 16 | 16 |
| | Na₂O Content Ratio | wt % | 1.1 | 1.1 | 1.1 | 1.1 | 1.1 | 1.1 |
| | K₂O Content Ratio | wt % | 3.4 | 3.4 | 3.4 | 3.4 | 3.4 | 3.4 |
| | MgO Content Ratio | wt % | 3.8 | 3.8 | 3.8 | 3.8 | 3.8 | 3.8 |
| | CaO Content Ratio | wt % | 2.5 | 2.5 | 2.5 | 3.5 | 2.5 | 2.5 |
| | Total Content Ratio Alkaline Earth Metal and Alkali Metal | wt % | 11 | 11 | 11 | 12 | 11 | 11 |
| Firing Temperature | | °C. | 1250 | 1250 | 1250 | 1250 | 1250 | 1250 |
| Oxide Phase Content Ratio | | vol % | 30 | 25 | 25 | 30 | 38 | 30 |
| Percent of Microscopic Alumina Particles Encapsulated in Oxide Phase relative to All Alumina Particles | | % | 78 | 67 | 53 | 80 | 83 | 61 |
| Oxide Phase Specific Weight | | g/cc | 1.6 | 1.6 | 1.6 | 1.6 | 1.6 | 1.6 |
| Porosity | | % | 39 | 37 | 45 | 36 | 33 | 37 |
| Strength | | MPa | 82 | 78 | 65 | 87 | 92 | 68 |
| Pore Diameter Distribution | Dp50 ($10^y$) | μm | 3.3 | 3.0 | 5.5 | 3.6 | 5.8 | 4.1 |
| | y | | 0.52 | 0.48 | 0.74 | 0.56 | 0.76 | 0.61 |
| | Dp10 ($10^{y+\gamma}$) | μm | 3.9 | 6.6 | 9.7 | 4.3 | 9.5 | 5.2 |
| | γ | | 0.07 | 0.34 | 0.25 | 0.08 | 0.21 | 0.10 |
| | Dp90 ($10^{y-\delta}$) | μm | 1.9 | 1.7 | 2 | 2.1 | 3.6 | 3.2 |
| | δ | | 0.24 | 0.25 | 0.44 | 0.23 | 0.21 | 0.11 |

| | | | Example 7 | Example 8 | Example 9 | Comparative Example 1 | Comparative Example 2 |
|---|---|---|---|---|---|---|---|
| Filtration Cell | Inner Diameter | mm | 1.8 | 1.8 | 1.8 | 2.2 | 1.8 |
| | Partition Wall Thickness | mm | 0.15 | 0.15 | 0.15 | 0.80 | 0.15 |
| Separation Membrane | Diameter φ | mm | 63 | 63 | 63 | 63 | 63 |
| | Length L | mm | 300 | 300 | 300 | 300 | 300 |
| | Membrane Surface Area | m² | 0.97 | 0.97 | 0.97 | 0.37 | 0.97 |
| Grain Size Distribution Aggregate Powder | Dg50 ($10^z$) | μm | 12 | 12 | 12 | 59 | 15 |
| | z | | 1.1 | 1.1 | 1.1 | 1.8 | 1.2 |
| | Dg10 ($10^{z-\alpha}$) | μm | 1.1 | 1.1 | 1.1 | 47 | 12 |
| | α | | 1.1 | 1.1 | 1.1 | 0.10 | 0.11 |
| | Dg90 ($10^{z+\beta}$) | μm | 33 | 33 | 33 | 81 | 21 |
| | β | | 0.43 | 0.43 | 0.43 | 0.14 | 0.16 |

TABLE 1-continued

|  |  |  |  |  |  |  |  |
|---|---|---|---|---|---|---|---|
| Aggregate Mixing Ratio | | wt % | 90 | 83 | 77 | 88 | 88 |
| Binding Material Mixing Ratio | | wt1 % | 10 | 17 | 23 | 12 | 12 |
| Composition in Oxide Phase | $SiO_2$ Content Ratio | wt % | 69 | 48 | 14 | 14 | 14 |
| | $Al_2O_3$ Content Ratio | wt % | 16 | 42 | 81 | 81 | 81 |
| | $Na_2O$ Content Ratio | wt % | 1.1 | 0.9 | 0.43 | 0.43 | 0.43 |
| | $K_2O$ Content Ratio | wt % | 3.4 | 2.6 | 1.5 | 1.5 | 1.5 |
| | MgO Content Ratio | wt % | 3.8 | 3.5 | 0.98 | 0.98 | 0.98 |
| | CaO Content Ratio | wt % | 2.5 | 0.6 | 0.02 | 0.02 | 0.02 |
| | Total Content Ratio Alkaline Earth Metal and Alkali Metal | wt % | 11 | 7.6 | 2.9 | 2.9 | 2.9 |
| Firing Temperature | | °C. | 1250 | 1250 | 1525 | 1525 | 1525 |
| Oxide Phase Content Ratio | | vol % | 21 | 25 | 25 | 14 | 14 |
| Percent of Microscopic Alumina Particles Encapsulated in Oxide Phase relative to All Alumina Particles | | % | 52 | 50 | 65 | 2.3 | 4.9 |
| Oxide Phase Specific Weight | | g/cc | 1.6 | 2.4 | 3.5 | 3.5 | 3.5 |
| Porosity | | % | 41 | 39 | 38 | 37 | 39 |
| Strength | | MPa | 50 | 54 | 72 | 24 | 38 |
| Pore Diameter Distribution | Dp50 ($10^y$) | μm | 2.7 | 2.9 | 3.0 | — | — |
| | y | | 0.43 | 0.46 | 0.48 | — | — |
| | Dp10 ($10^{y+\gamma}$) | μm | 9.2 | 7.2 | 6.7 | — | — |
| | γ | | 0.53 | 0.39 | 0.35 | — | — |
| | Dp90 ($10^{y-\delta}$) | μm | 0.8 | 1.1 | 1.6 | — | — |
| | δ | | 0.53 | 0.42 | 0.27 | — | — |

As shown in Table 1, it was difficult to increase compactness and/or reduce weight in relation to Comparative Example 1 (prior art example) since the membrane surface area of the monolithic base was reduced when attempting to realize a higher membrane surface area and the strength as a structure was increased by increasing of the partition wall thickness. Furthermore, it was not possible to reduce the partition wall thickness since there was a tendency for the extrusion nozzle to become blocked when performing molding using coarse aggregate alumina, even when the partition wall thickness using the same starting material was reduced. In contrast, Comparative Example 2 had a thin partition wall thickness, and formed filtration cells by use of a highly-densified base that has a high membrane surface area due to using an aggregate that has a small average particle diameter ($D_g50$). However, structural strength could not be maintained in comparison to Comparative Example 1 since the partition wall thickness was less than or equal to ⅕.

Figure 5:
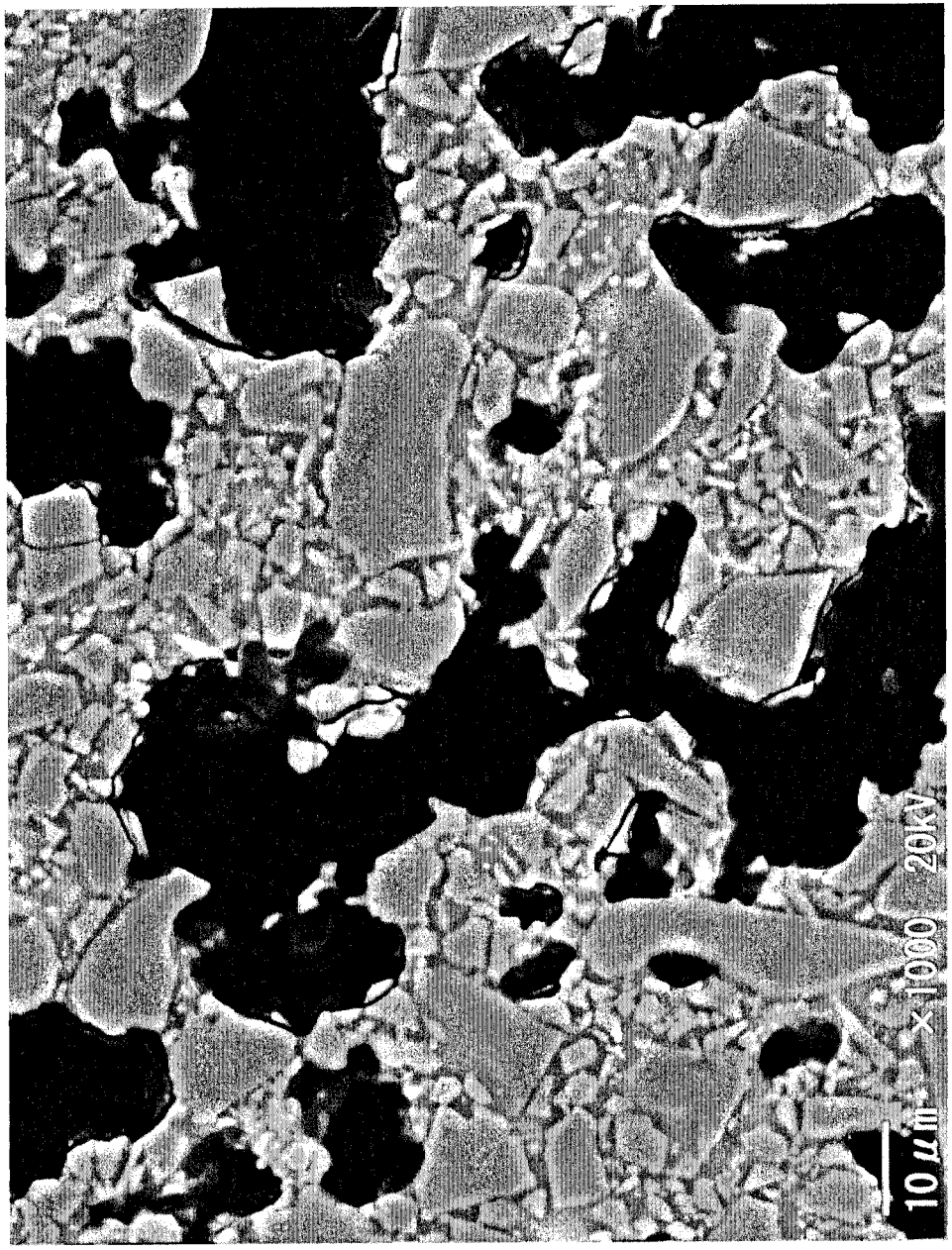
FIG. 5 is a cross-sectional SEM image of a monolithic base according to Example 5.
Figure 6:
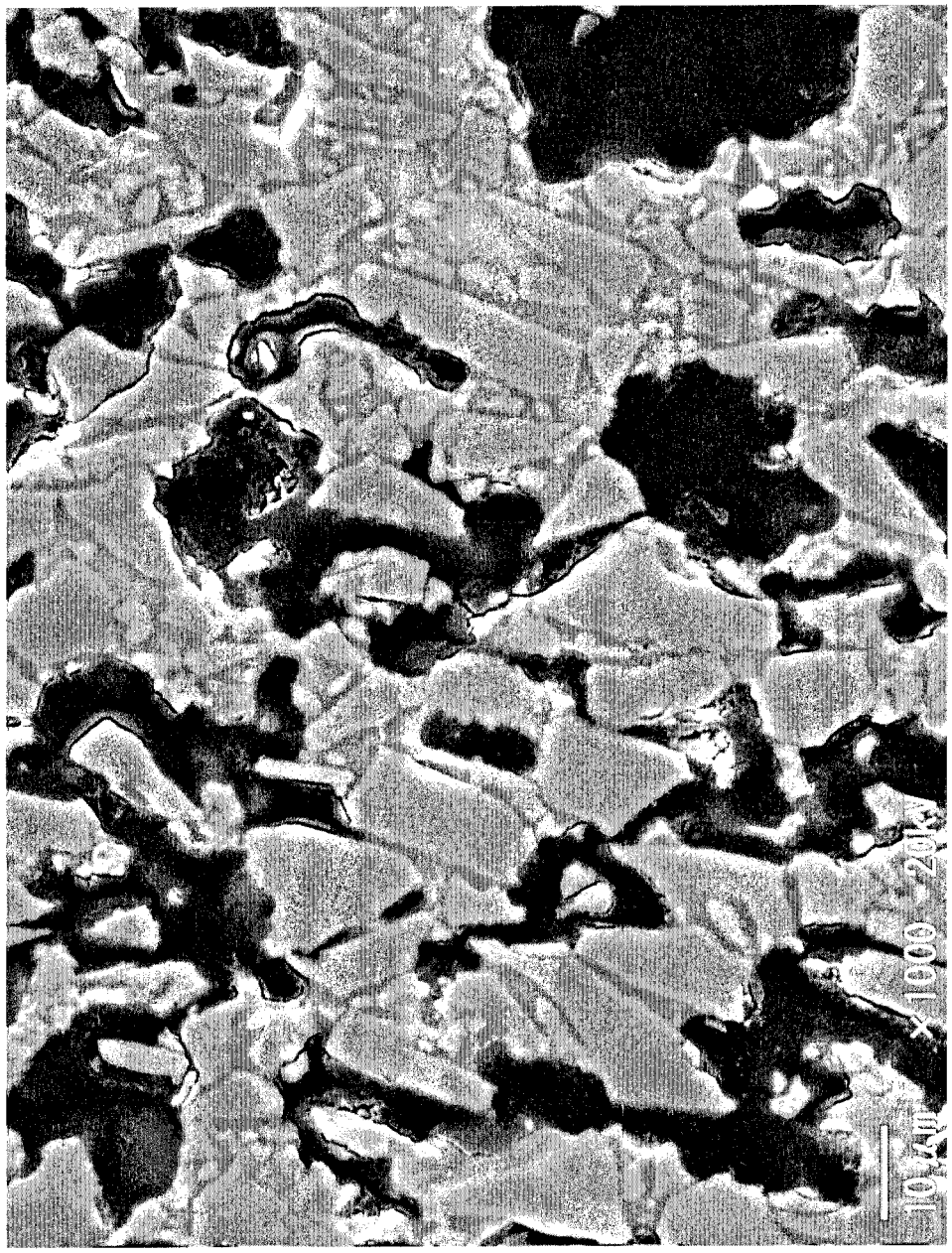
FIG. 6 is a cross-sectional SEM image of a monolithic base according to Example 6.
Figure 7:
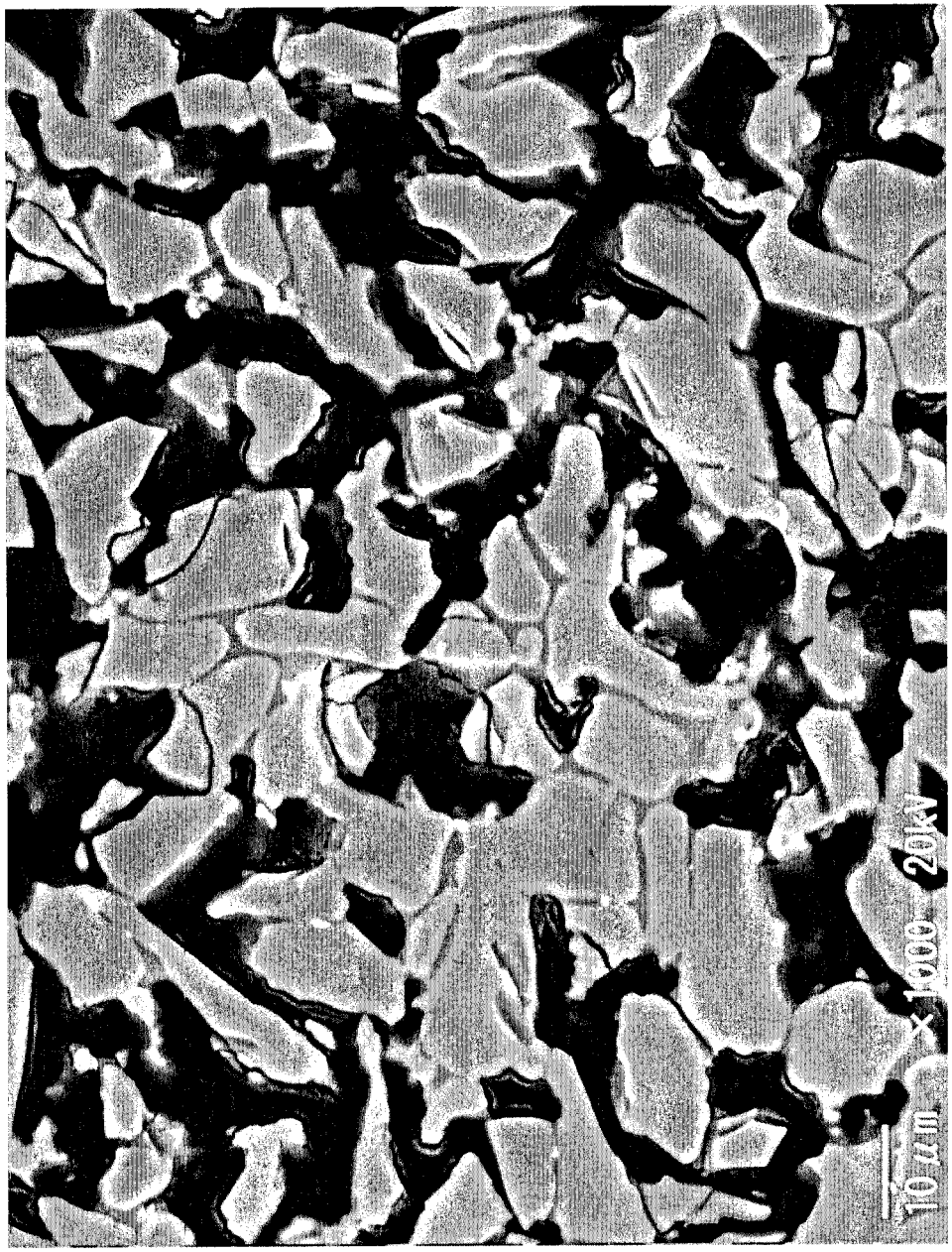
FIG. 7 is a cross-sectional SEM image of a monolithic base according to Comparative Example 1.

On the other hand, Examples 1 to 9 enhanced the strength of the material (alumina porous body) itself that configures the monolithic base since the percentage of the microscopic alumina particles encapsulated in the oxide phase was greater than or equal to 50% as a result of use of an aggregate powder that has a broad grain size distribution. As a result, Examples 1 to 9 could maintain the structural strength of the monolithic base even when reducing the partition wall thickness in comparison to Comparative Example 1. As shown in FIG. 4 to FIG. 6, in Examples 1 to 9, a large number of microscopic alumina particles encapsulated in the oxide phase was included, and the ratios are shown in Table 1. Although the reason for the increase in the strength due to the presence of a large number of microscopic alumina particles in the oxide phase is unclear, it is thought that the strength is increased due to suppression of crack extension in the oxide phase by those microscopic alumina particles.

Furthermore, although Table 1 shows the chemical composition in the oxide phase in Examples 1 to 6, it can be seen that adjustment of the content ratio of the alkali earth metal and/or alkali metal enabled a reduction in the eutectic point, an increase in wettability, and facilitated encapsulation of the microscopic alumina particles by the oxide phase. On the other hand, Comparative Examples 1 and 2 contain an insufficient amount of an alkali earth metal and/or alkali metal, and therefore could not sufficiently reduce the eutectic point. Therefore the firing temperature had to be increased and consequently increased the energy required during firing.

Furthermore, the content ratio of $SiO_2$ in the oxide phase of Examples 1 to 6 was suitably adapted to thereby enabled a reduction in the specific weight of the oxide phase and a reduction in the weight of the monolithic base.

It is further noted that although Example 2 reduced the oxide phase in comparison to Example 1, it can be seen that sufficient strength is imparted as long as within the range of the present application. In the same manner, Example 3 reduced the pressure loss of the resulting alumina porous body by increasing the ratio (porosity) of pores by use of a pore forming agent. At the same time, although the surface area of contact between alumina particles and pores is increased by the corresponding increase in the pores, the ratio of alumina particles encapsulated in the oxide phase is reduced. However, sufficient strength is imparted as long as within the range of the present application. The sintering characteristics and strength in Example 4 were further enhanced as a result of increasing the alkali earth metal and/or alkali metal in the oxide phase by addition of CaO. In Example 5, the microscopic alumina particles encapsulated in the oxide phase were increased and further enhancement to strength was enabled by increasing the oxide phase itself.

Furthermore, in comparison to Example 1, although Example 6 reduced the number of microscopic alumina particles, it can be seen that sufficient strength was imparted as long as within the range of the present application.

Furthermore, in comparison to Example 2, although Example 7 further reduced the oxide phase, sufficient strength could be maintained since a reduction in the eutectic point and an increase in wettability were enabled by sufficient adjustment to the content ratio of the alkali earth metal and/or alkali metal, and since the ratio of the microscopic alumina particles encapsulated in the oxide phase, even in a reduced amount of oxide phase, fell within the range of the present application.

Furthermore, in comparison to Example 2, since Example 8 reduced the content ratio of the alkali earth metal and/or alkali metal, the eutectic point could not be sufficiently reduced. Since the firing temperature was the same, although the resulting wettability of the oxide phase was not enhanced and the ratio of microscopic alumina particles encapsulated in the oxide phase was reduced, it can be seen that sufficient strength was imparted as long as within the range of the present application. Furthermore, although there was a reduction in the content ratio of $SiO_2$ in Example 8, it can be seen that the specific weight of the oxide phase could be maintained to a relative small value as long as within the range of the present application.

Furthermore, since Example 9 further reduced the content ratio of the alkali earth metal and/or alkali metal, and since it is assumed that the eutectic point could not be reduced, the firing temperature was increased. As a result, it can be seen that strength was increased since the wettability was enhanced and the ratio of microscopic alumina particles encapsulated in the oxide phase was sufficiently maintained. However since there was a reduction in the content ratio of $SiO_2$, the specific weight of the oxide phase took a large value.

Furthermore, since the pore diameter distribution in Examples 1 to 6 and 9 was the sharp pore diameter distribution shown in Table 1, as long as within the range of the present application, pressure loss was effectively reduced, and when forming the intermediate layer on the monolithic base, the base pores were not blocked as a result of infiltration of the intermediate layer slurry into the inner portion of the base. On the other hand, in Example 7, since the amount of oxide phase was low, the fine microscopic pores formed in the gaps of the microscopic alumina particles could not be sufficiently reduced. Furthermore in Example 7, it was not possible to sufficiently reduce the coarse pores by reducing the ratio of effective connection between the coarse alumina particles due to the fact that there is a similar small amount of oxide phase. In addition, in Example 8, since a sufficient increase in the wettability of the oxide phase was not enabled, the oxide phase did not penetrate into the spaces between the microscopic alumina particles and the fine microscopic pores could not be sufficiently reduced.

The invention claimed is:

1. A monolithic base comprising pores and configured by alumina particles as an aggregate and an oxide phase as a binding material, wherein
the alumina particles include microscopic alumina particles having a particle diameter of greater than or equal to 0.5 μm and less than or equal to 5 μm and coarse alumina particles having a particle diameter of greater than 5 μm,
the number of microscopic alumina particles that are encapsulated in the oxide phase is greater than or equal to 50% of the total number of microscopic alumina particles and coarse alumina particles.

2. The monolithic base according to claim 1, wherein the oxide phase includes Si and Al and at least one of an alkali earth metal and an alkali metal.

3. The monolithic base according to claim 2, wherein the oxide phase includes both of an alkali earth metal and an alkali metal.

4. The monolithic base according to claim 2, wherein a content ratio of the oxide phase is greater than or equal to 22 volume % and less than or equal to 38 volume %.

5. The monolithic base according to claim 2, wherein a content ratio of Si in the oxide phase is greater than or equal to 50 mass % and less than or equal to 90 mass % using an $SiO_2$ conversion, and
a total content ratio of an alkali metal and an alkali earth metal in the oxide phase is greater than or equal to 9 mass % and less than or equal to 15 mass % using an oxide conversion.

6. The monolithic base according to claim 5, wherein a specific weight of the oxide phase is greater than or equal to 1 g/cc and less than or equal to 3 g/cc.

7. The monolithic base according to claim 1 comprising:
a plurality of filtration cells extending respectively from a first end face to a second end face, wherein
a partition wall thickness between two adjacent through holes of the plurality of filtration cells is greater than or equal to 0.05 mm to less than or equal to 0.20 mm.

8. The monolithic base according to claim 1, wherein a porosity of the pores in a cross section is greater than or equal to 30% to less than or equal to 45%.

9. The monolithic base according to claim 1, wherein a $D_p50$ of the pores is greater than or equal to 2 μm to less than or equal to 6 μm.

10. The monolithic base according to claim 9, wherein when the $D_p50$ of the pores is configured as $10^y$ μm, a $D_p10$ of the pores is less than or equal to $10^{(y+0.5)}$ μm, and
when the $D_p50$ of the pores is configured as $10^y$ μm, a $D_p90$ of the pores is greater than or equal to $10^{(y-0.5)}$ μm.

11. A method of manufacturing a monolithic base comprising:
forming a green body for a monolithic base having a plurality of pores and configured by an oxide phase starting material powder as a binding material and an alumina particle powder as an aggregate, and
firing the green body, wherein
a $D_g50$ of the alumina particle powder is greater than or equal to 5 μm to less than or equal to 40 μm,
a $D_g10$ of the alumina particle powder is less than or equal to $10^{(z-0.2)}$ μm, when the $D_g50$ of the alumina particle powder is configured as $10^z$ μm, and
a $D_g90$ of the alumina particle powder is greater than or equal to $10^{(z+0.2)}$ μm, when the $D_g50$ of the alumina particle powder is configured as $10^z$ μm.

12. The method of manufacturing a monolithic base according to claim 11, wherein
the oxide phase includes Si and Al and at least one of an alkali earth metal and an alkali metal, and
a content ratio of the oxide phase is greater than or equal to 6.6 mass % and less than or equal to 32 mass % using an oxide conversion.

13. The method of manufacturing a monolithic base according to claim 12, wherein a content ratio of Si in the oxide phase is greater than or equal to 50 mass % and less than or equal to 90 mass % using an $SiO_2$ conversion, and a content ratio of an alkali metal and an alkali earth metal in the oxide phase is greater than or equal to 9 mass % and less than or equal to 15 mass % using an oxide conversion.

14. The method of manufacturing a monolithic base according to claim 11, wherein a firing temperature in the step of firing the green body is greater than or equal to 1100 degrees C. and less than or equal to 1400 degrees C.

* * * * *